(12) United States Patent
Jungwirth

(10) Patent No.: US 9,818,009 B2
(45) Date of Patent: Nov. 14, 2017

(54) MULTI-SPECTRAL ENHANCEMENTS FOR SCAN CAMERAS

(75) Inventor: Douglas Jungwirth, Porter Ranch, CA (US)

(73) Assignee: The Boeing Company, Chicago, IL (US)

( * ) Notice: Subject to any disclaimer, the term of this patent is extended or adjusted under 35 U.S.C. 154(b) by 283 days.

(21) Appl. No.: 13/485,929

(22) Filed: Jun. 1, 2012

(65) Prior Publication Data
US 2013/0321807 A1    Dec. 5, 2013

(51) Int. Cl.
*G01J 3/28* (2006.01)
*G06K 7/10* (2006.01)
*G02B 26/12* (2006.01)
*G02B 27/10* (2006.01)

(52) U.S. Cl.
CPC ....... *G06K 7/10574* (2013.01); *G02B 26/123* (2013.01); *G02B 27/1013* (2013.01); *G06K 7/10603* (2013.01); *G06K 7/10663* (2013.01)

(58) Field of Classification Search
CPC ........... G06K 7/10752; G06K 7/10544; G06K 7/10554; G06K 7/10574; G06K 7/10603; G06K 7/10673; G06K 7/10722; G06K 7/10831; G06K 2007/10485; G06K 2826/123; G06K 7/10663; G02B 27/1013; G02B 26/123
USPC ....................................................... 356/328
See application file for complete search history.

(56) References Cited

U.S. PATENT DOCUMENTS

| | | | | |
|---|---|---|---|---|
| 3,864,044 A | * | 2/1975 | Lyshkow | ........................ 356/436 |
| 4,230,393 A | * | 10/1980 | Burke, Jr. | ................... 359/220.1 |
| 4,794,398 A | | 12/1988 | Raber et al. | |
| 5,007,692 A | * | 4/1991 | Matsuura | .................... 359/217.1 |
| 5,068,677 A | * | 11/1991 | Matsuura et al. | ............ 347/241 |
| 5,258,605 A | * | 11/1993 | Metlitsky et al. | ........ 235/462.32 |
| 5,717,221 A | * | 2/1998 | Li et al. | ........................ 250/566 |
| 5,917,171 A | | 6/1999 | SaSai | |
| 5,988,502 A | | 11/1999 | Krichever et al. | |
| 6,278,538 B1 | | 8/2001 | Schleipen | |
| 6,293,468 B1 | | 9/2001 | Rantze et al. | |
| 6,433,907 B1 | * | 8/2002 | Lippert | ................... G02B 26/08 |
| | | | | 359/201.1 |
| 6,595,427 B1 | | 7/2003 | Soni et al. | |
| 7,116,749 B2 | | 10/2006 | Besson | |
| 7,554,586 B1 | | 6/2009 | Imai et al. | |
| 9,038,907 B1 | * | 5/2015 | Lebaschi | ............ G06K 7/10851 |
| | | | | 235/380 |
| 2002/0185535 A1 | * | 12/2002 | Tsikos | .................... B82Y 15/00 |
| | | | | 235/454 |

(Continued)

OTHER PUBLICATIONS

EP13170080.9 Extended Search Report, dated Oct. 7, 2013.

(Continued)

*Primary Examiner* — Hina F Ayub
(74) *Attorney, Agent, or Firm* — McDonnell Boehnen; Hulbert & Berghoff LLP

(57) ABSTRACT

A multi-spectral scan camera and methods are presented. Light beams are emitted from a plurality of light sources comprising a plurality of spectral wavelengths respectively. The light beams from the light sources are scanned across a field of view at a plurality of respective angles using a scan mirror, and each of the spectral wavelengths are received at respective detectors.

20 Claims, 6 Drawing Sheets

(56) References Cited

U.S. PATENT DOCUMENTS

2005/0190424 A1* 9/2005 Reichenbach et al. ....... 359/216
2007/0153270 A1* 7/2007 Yun .................... G02B 26/0808
  356/328

OTHER PUBLICATIONS

Communication pursuant to Article 94(3) EPC issued in European Patent Application No. 13170080.9 dated Nov. 9, 2015.
State Intellectual Property Office, English Translation of Second Office Action and Search Report for Chinese Pat. App. No. 201310211396.X, dated Dec. 5, 2016.
State Intellectual Property Office, English Translation of First Office Action for Chinese Pat. App. No. 201310211396.X, dated Apr. 1, 2016.
State Intellectual Property Office, English Translation of Search Report for Chinese Pat. App. No. 201310211396.X, dated Apr. 1, 2016.

* cited by examiner

MULTI-SPECTRAL ENHANCEMENTS FOR SCAN CAMERAS

FIELD

Embodiments of the present disclosure relate generally to sensors. More particularly, embodiments of the present disclosure relate to scan cameras.

BACKGROUND

Scan cameras generally scan an image by scanning a pixel cross a scan line and progressively scanning lines to produce an image. Scan cameras are frequently used for scanning production lines and bar codes.

SUMMARY

A multi-spectral scan camera and methods are presented. Light beams are emitted from a plurality of light sources comprising a plurality of spectral wavelengths respectively. The light beams from the light sources are scanned across a field of view at a plurality of respective angles using a scan mirror, and each of the spectral wavelengths are received at respective detectors.

In this manner, a multi-spectral scan camera provides a capability to increase an effective frame rate of an existing scan camera by using multi-spectral light sources (lasers with different wavelengths) and corresponding spectrally selective detectors.

In an embodiment, a multi-spectral scan camera comprises light sources, a scan mirror, and detectors. The light sources comprise respective spectral wavelengths, and the scan mirror scans light beams from the light sources respectively across a field of view at a plurality of respective scan angles. The detectors receive each of the spectral wavelengths respectively.

In another embodiment, a method for multi-spectral scanning emits light beams from light sources comprising spectral wavelengths respectively, and scans the light beams from the light sources across a field of view at respective scan angles using a scan mirror. The method further receives each of the spectral wavelengths at respective detectors.

In a further embodiment, a method for providing a multi-spectral scan camera provides light sources comprising spectral wavelengths respectively, and provides a scan mirror operable to scan light beams from the light sources across a field of view at respective scan angles. The method further provides detectors operable to receive each of the spectral wavelengths respectively.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
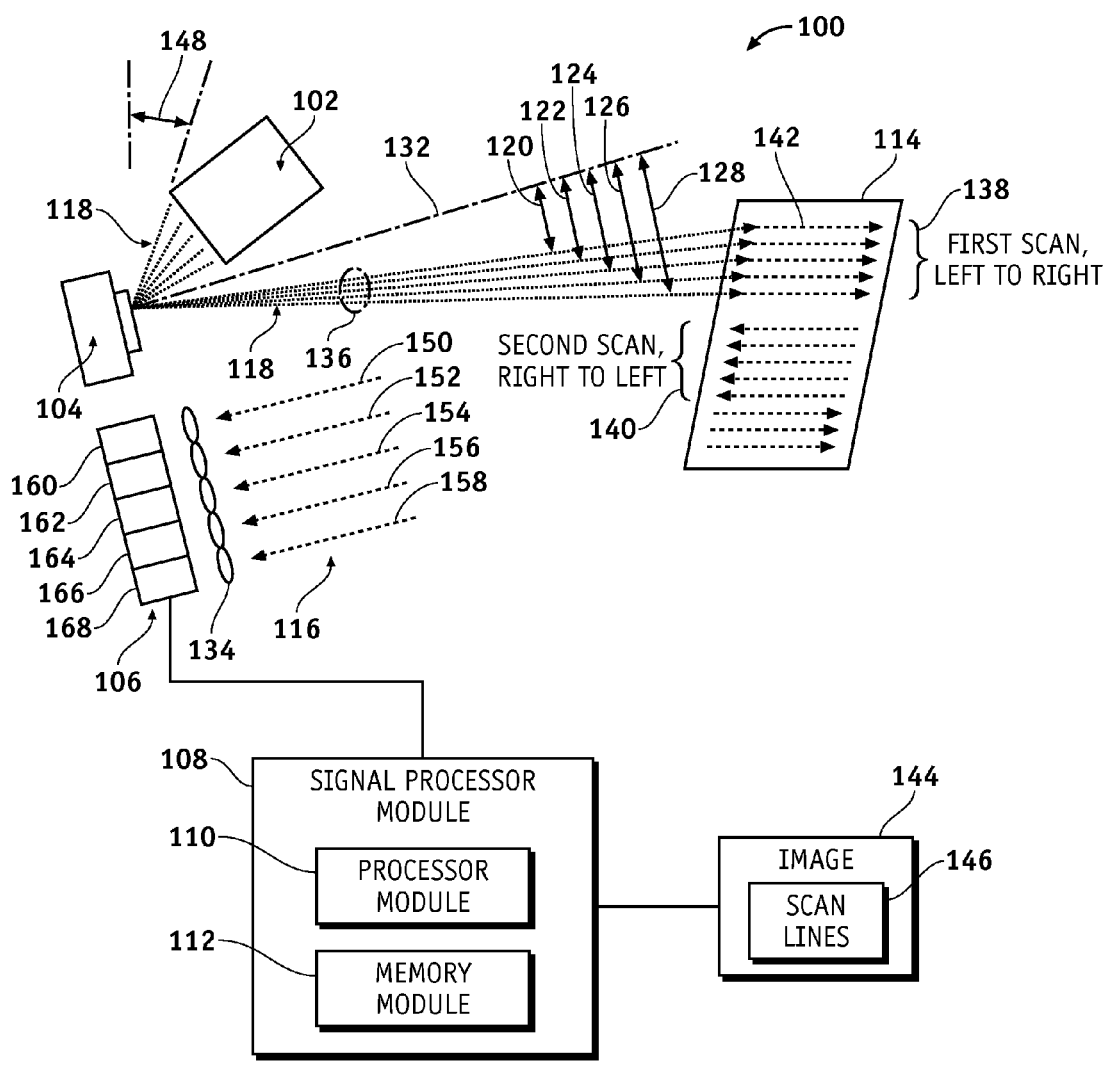
FIG. 1 is an illustration of an exemplary multi-spectral scan camera according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, cameras, light sensors, electronic circuits, electronic devices, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, an optical camera. Embodiments of the disclosure, however, are not limited to such optical camera applications, and the techniques described herein may also be utilized in other applications. For example but without limitation, embodiments may be applicable to infrared, ultraviolet, X-ray, or other scan cameras.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Scan cameras are generally limited by scan rates that can be achieved by an existing technology of scan mirrors. This limits the frame rates of some scan camera systems to about 5 frames per second. Scan camera system requirements generally need about 30 frames per second for optimal performance. Embodiments of the discloser provide a capability to increase an effective frame rate of an existing scan camera by using multi-spectral light sources (e.g., lasers with different wavelengths) and corresponding spectrally selective detectors. The embodiments allow an illuminated area to be substantially simultaneously scanned by many distinguishable light beams. A scan mirror, which is generally a slowest part of a scan camera system, substantially simultaneously scans many different laser light beams during each horizontal scan. Wavelength selective detectors each detect a single light beam and record data associated with a trace of the single light beam.

FIG. 1 is an illustration of an exemplary multi-spectral scan camera system 100 (system 100) according to an embodiment of the disclosure. System 100 may comprise a plurality of light sources 102, a scan mirror 104, a plurality of detectors 106, and a signal processor module 108. A light 118 from the light sources 102 is scanned across a field of view 114 by the scan mirror 104, and a received light 116 is received from the field of view 114 at the detectors 106. The light 118 is repeatedly scanned across the field of view 114 to image the field of view 114.

The light sources 102 may comprise, for example but without limitation, a laser, a filtered light, or other spectrally selective light source. The light sources 102 comprise a plurality of spectral wavelengths (spectral colors) 150, 152, 154, 156, and 158 respectively. The spectral wavelengths (spectral colors) 150-158 may comprise, for example but without limitation, visible light, infrared light, ultra violet light, X-rays, or spectrums of electromagnetic energy (light). The spectral wavelengths (spectral colors) 150-158 may each comprise, for example but without limitation, individual bands of wavelength, a specific wavelength, a group of wavelengths, or other distinguishable wavelengths. In this document, spectral wavelengths and spectral colors may be used interchangeably. The light sources 102 each emit a respective spectrum of light in a form of light beams 136 that distinguishes each of a plurality of view scan lines 142 that are scanned across the field of view 114. The light 118 may incident the scan mirror 104 at a plurality of incident angles 148.

The scan mirror 104 scans the light beams 136 of the light 118 from the light sources 102 across the field of view 114 at a plurality of respective scan angles 120, 122, 124, 126, and 128. In FIG. 1, the scan angles 120-128 are shown relative to a center line 132 perpendicular to the scan mirror 104. Scan cameras, both 2 dimensional and 3 dimensional, are generally limited in their speed due to a scan speed of the scan mirror 104. The scan mirror 104 reflects the light beams 136 of the light 118 from each of the light sources 102 (e.g., a laser) in a raster scan pattern across the field of view 114. The scan mirror 104 makes a full scan across the field of view 114 for each frame (field) of data. For example, a first scan 138 of the light beams 136 may be from left to right and a second scan 140 of the light beams 136 may be from right to left. Each of the light beams 136 of the light 118 from each of the light sources 102 comprises a specific wavelength, which may be disjoint from wavelengths from other of the light sources 102. Each of the light beams 136 of the light 118 from each of the light sources 102 comprises a specific angle and the light beams 136 are reflected off the scan mirror 104 at a plurality of scan angles 120 to 128 respectively.

The detectors 106 receive each of the spectral wavelengths 150-158 of the received light 116 respectively from the field of view 114. Each detector 160-168 receives one of the spectral wavelengths 150-158 from each of the view scan lines 142 respectively. The detectors 106 are wavelength selective, and thus are each tuned specifically to wavelengths (illuminating wavelengths) of each of the spectral wavelengths 150-158 respectively. A vertical scan rate of the system 100 is increased by a factor of a number of simultaneous light beams such as the light beams 136 of the light 118 projected from the light sources 102. For example, as shown in FIG. 1, if the light beams 136 comprise five beams of the light 118 that are scanned across the field of view 114, the field of view 114 may be scanned five times as quickly. The detectors 106 detect the received light 116 from the field of view 114 and record a magnitude of the received light 116 associated with each of the scan angles 120 to 128 as the light 118 is scanned across the field of view 114. The detectors 106 may each comprise one of a plurality of lenses 134 to focus the received light 116.

The signal processor module 108 is configured to form and interleave a plurality of image scan lines 146 received by the detectors 106 based on the received light 116. The signal processor module 108 may comprise, for example but without limitation, a processor module 110, a memory module 112, or other module. The processor module 110 comprises processing logic that is configured to carry out the functions, techniques, and processing tasks associated with the operation of the system 100. In particular, the processing logic is configured to support the system 100 described herein. For example, the signal processor module 108 may form the received light 116 into the image scan lines 146 corresponding to each of the spectral wavelengths 150-158 of the received light 116 received at the detectors 106. The signal processor module 108 may construct an image 144 comprising a representation of the field of view 114 by interleaving the image scan lines 146. The image 144 may be stored in the memory module 112.

The processor module 110 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 112 may comprise a data storage area with memory formatted to support the operation of the system 100. The memory module 112 is configured to store, maintain, and provide data as needed to support the functionality of the system 100. For example but without limitation, the memory module 112 may store intensity of the received light 116, the image scan lines 146, the image 144, or other data.

In some embodiments, the memory module 112 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 112 may be coupled to the processor module 110 and configured to store, for example but without limitation, a database, a computer program that is executed by the processor module 110, an operating system, an application program, tentative data used in executing a program, or other application. Additionally, the memory module 112 may represent a dynamically updating database containing a table for updating the database, and the like.

The memory module 112 may be coupled to the processor module 110 such that the processor module 110 can read information from and write information to the memory module 112. For example, the processor module 110 may access the memory module 112 to access the received light 116, the image scan lines 146, the image 144, or other data.

As an example, the processor module 110 and memory module 112 may reside in respective application specific integrated circuits (ASICs) or other programmable devices. The memory module 112 may also be integrated into the processor module 110. In an embodiment, the memory module 112 may comprise a cache memory for storing temporary variables or other intermediate information during execution of instructions to be executed by the processor module 110.

Figure 2:
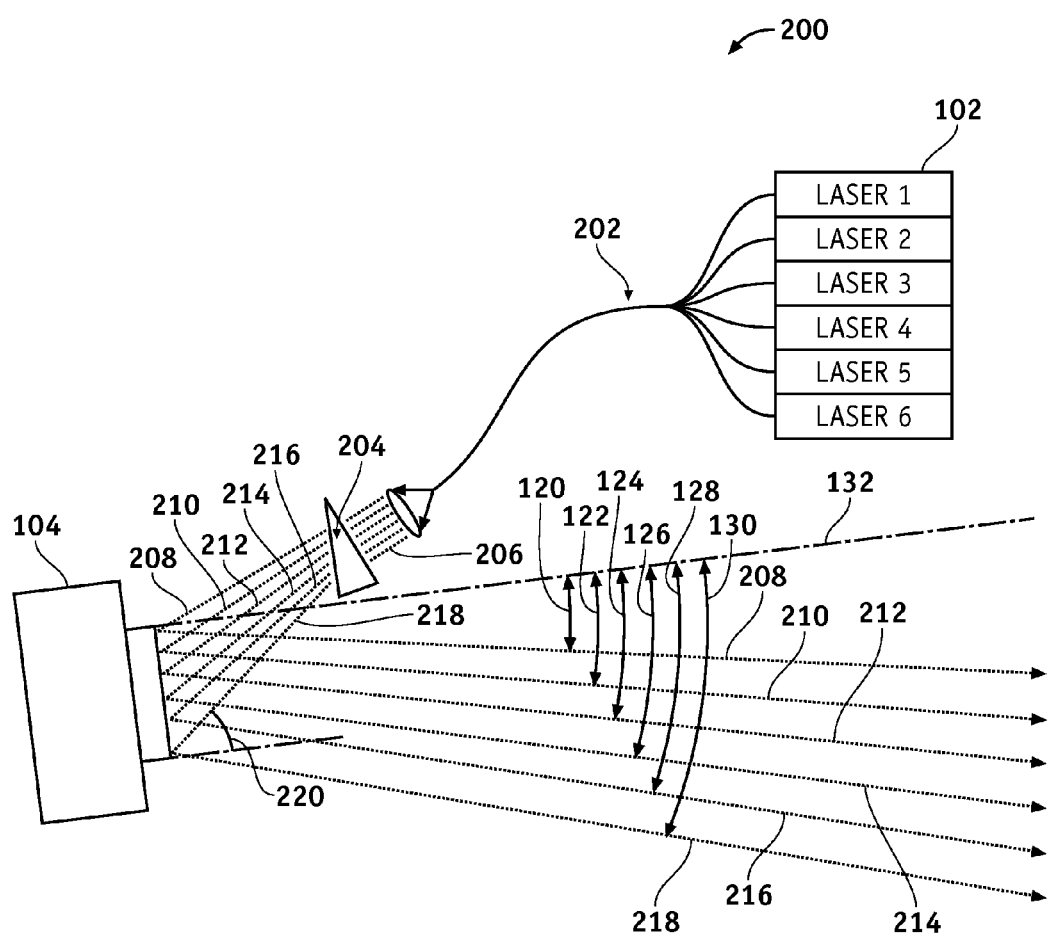
FIG. 2 is an illustration of an exemplary multi-spectral scan camera according to an embodiment of the disclosure.

FIG. 2 is an illustration of an exemplary multi-spectral scan camera 200 according to an embodiment of the disclosure. The multi-spectral scan camera 200 may have functions, material, and structures that are similar to the embodiments shown in FIG. 1. Therefore common features, functions, and elements may not be redundantly described here.

In the embodiment shown in FIG. 2, the light sources 102 comprise a plurality of lasers (1-6). The light sources 102 are coupled to an optical fiber 202 and formed into collimated light 206. The collimated light 206 is dispersed by a dispersive element 204 into light beams 208, 210, 212, 214, 216 and 218 (light 208-218) at a plurality of respective incident angles 220. The light beams 208-218 are then reflected off the scan mirror 104 at a plurality of scan angles 120, 122, 124, 126, 128, and 130 respectively.

The optical fiber 202 may comprise, for example but without limitation, a glass, a plastic, or other optical fiber. The optical fiber 202 may also comprise, for example but without limitation, a flexible transparent fiber that functions as a waveguide or "light pipe" to transmit light between two ends of the optical fiber 202. Furthermore, the optical fiber 202 may comprise, for example but without limitation, a transparent core surrounded by a transparent cladding material with a lower index of refraction, or other optical fiber configuration. Light may be kept in the transparent core by internal reflection (e.g., total internal reflection), which causes the optical fiber 202 to act as a waveguide. Optical fibers that support many propagation paths or transverse modes are generally called multi-mode fibers (MMF), while optical fibers that only support a single mode are generally called single-mode fibers (SMF).

The dispersive element 204 disperses light (light beams 208-218) from the light sources 102. The dispersive element 204 may comprise, for example but without limitation, a prism, a diffraction grating, or other dispersive element. The dispersive element 204 disperses the light beams 208-218 at the respective incident angles 220. The light beams 208-218 are then reflected off the scan mirror 104 at the scan angles 120-130 respectively.

Figure 3:
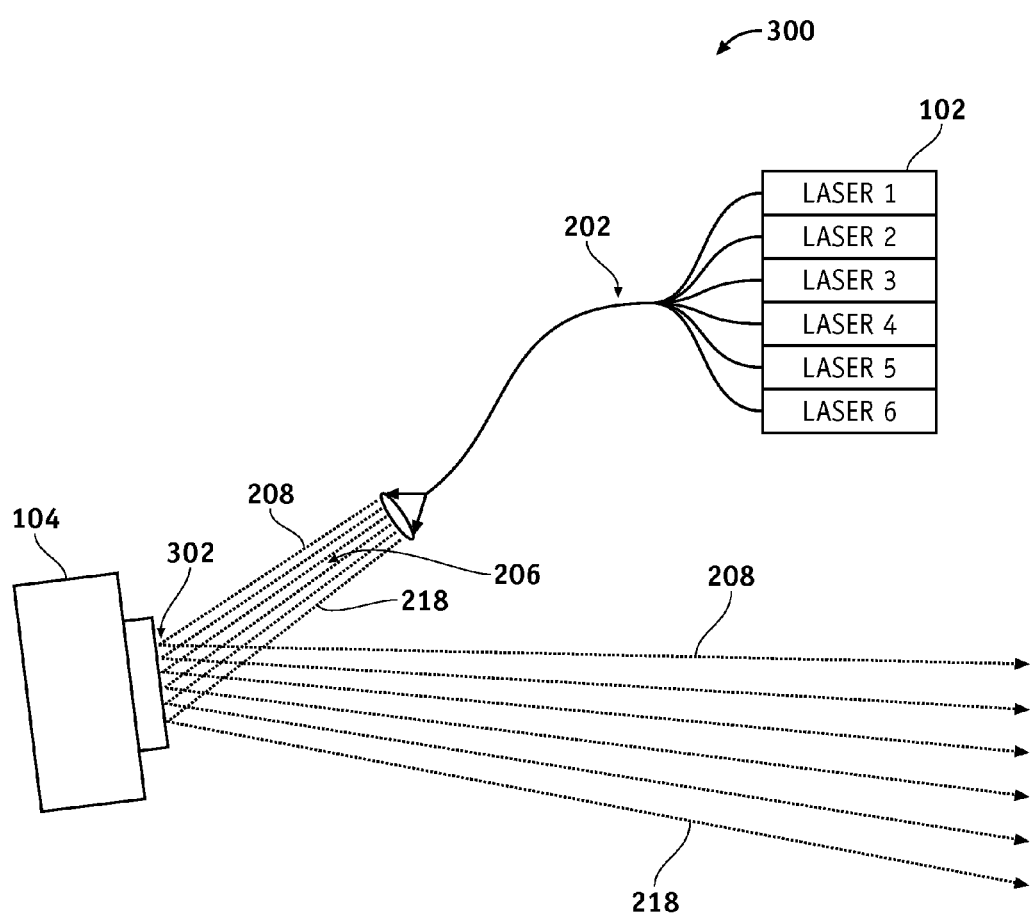
FIG. 3 is an illustration of an exemplary multi-spectral scan camera according to an embodiment of the disclosure.

FIG. 3 is an illustration of an exemplary multi-spectral scan camera according to an embodiment of the disclosure. The multi-spectral scan camera 300 may have functions, material, and structures that are similar to the embodiments shown in FIG. 1. Therefore common features, functions, and elements may not be redundantly described here. In the embodiment shown in FIG. 3, the scan mirror 104 comprises a dispersive element 302. The scan mirror 104 comprising the dispersive element 302 may comprise, for example but without limitation, a prism, a diffraction grating, or other light diffracting configuration. The collimated light 206 comprising the light beams 208-218 is dispersed by dispersive element 302 when the light beams 208-218 are reflected off the scan mirror 104. The light beams 208-218 are reflected off the scan mirror 104 at the scan angles 120, 122, 124, 126, 128, and 130 (FIG. 2) respectively.

Figure 4:
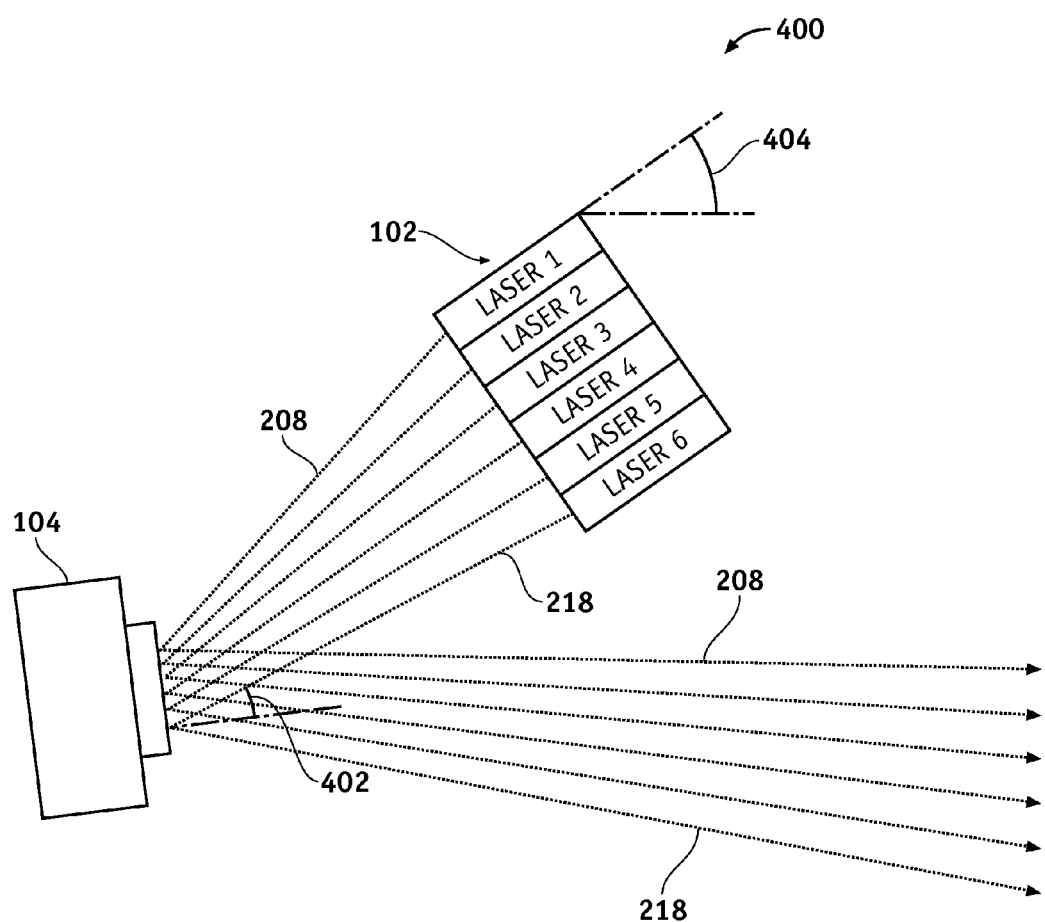
FIG. 4 is an illustration of an exemplary multi-spectral scan camera according to an embodiment of the disclosure.

FIG. 4 is an illustration of an exemplary multi-spectral scan camera according to an embodiment of the disclosure. The multi-spectral scan camera 400 may have functions, material, and structures that are similar to the embodiments shown in FIG. 1. Therefore common features, functions, and elements may not be redundantly described here. In the embodiment shown in FIG. 4, the light sources 102 are positioned at a plurality of respective light source angles 404. By positioning the light sources 102, at the respective light source angles 404, the light beams 208-218 are dispersed at a plurality of respective incident angles 402 without a need for the dispersive element 204/302.

The light beams 208-218 from the light sources 102 incident the scan mirror 104 at a plurality of respective incident angles 402, and are reflected off the scan mirror 104 at the scan angles 120, 122, 124, 126, 128, and 130 (FIG. 2) respectively. The light source angles 404 and the incident angles 402 may comprise substantially same angles, or may be different.

In some embodiments, the light sources 102 are positioned at a plurality of respective light source angles 404 and may be used in conjunction with the dispersive element 204/302 to provide dispersion of the light beams 208-218.

Figure 5:
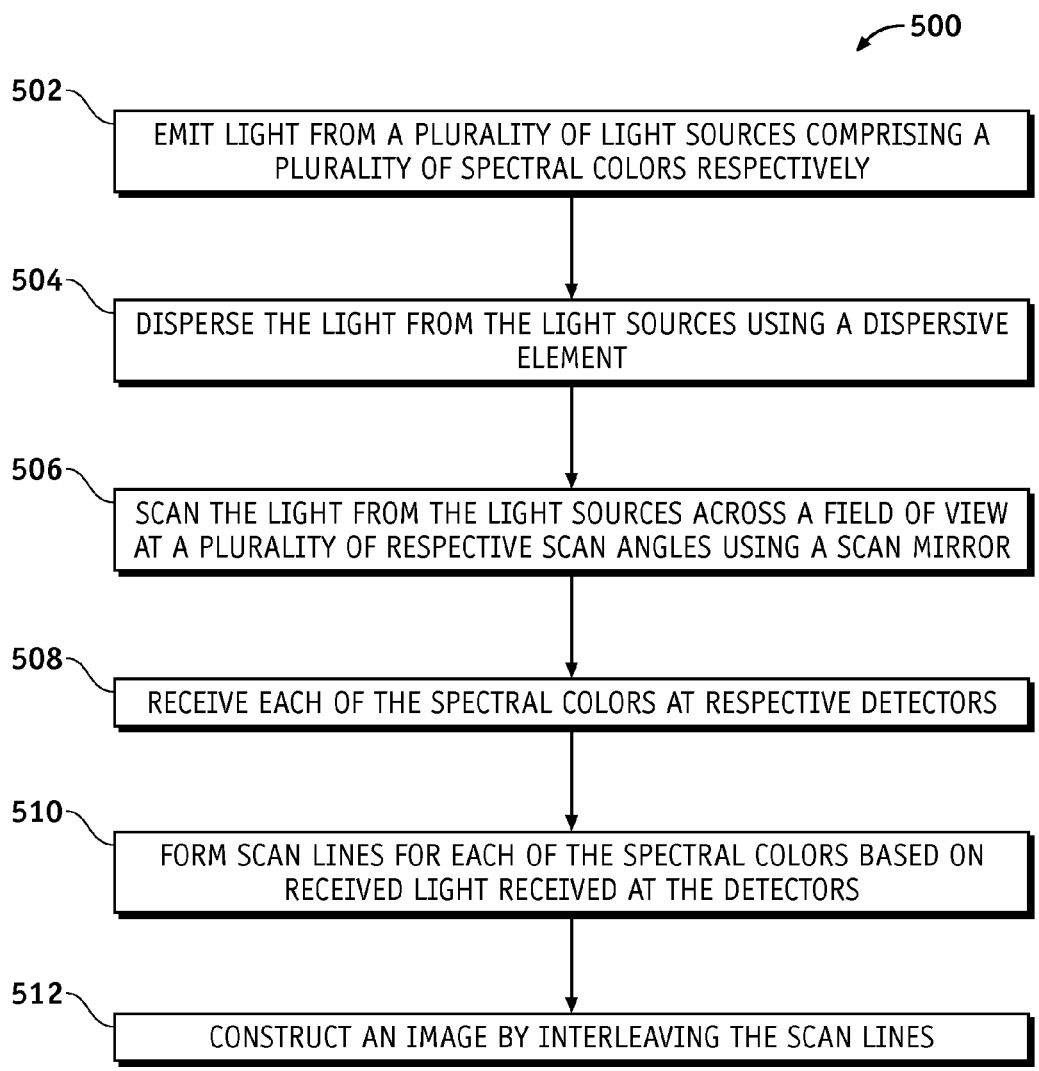
FIG. 5 is an illustration of an exemplary flowchart showing a process for multi-spectral scanning according to an embodiment of the disclosure.

FIG. 5 is an illustration of an exemplary flowchart showing a process 500 for multi-spectral scanning according to an embodiment of the disclosure. The various tasks performed in connection with process 500 may be performed mechanically, by software, hardware, firmware, computer-readable software, computer readable storage medium, or any combination thereof. It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein.

For illustrative purposes, the following description of process 500 may refer to elements mentioned above in connection with FIG. 1. In some embodiments, portions of the process 500 may be performed by different elements of the system 100 and multi-spectral scan cameras 200-400 such as: the light sources 102, the scan mirror 104, the detectors 106, the signal processor module 108, etc. It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein.

Process 500 may begin by emitting light such as the light 118/light beams 136/light beams 208-218 from a plurality of light sources such as the light sources 102 comprising a plurality of spectral wavelengths (colors) such as the spectral wavelengths 150-158 respectively (task 502).

Process 500 may continue by dispersing light such as the collimated light 206 from the light sources 102 using a dispersive element such as the dispersive element 204/302 (task 504). As mentioned above, the dispersive element 204/302 may comprise, for example but without limitation, a prism, a diffraction grating, or other dispersive element. The light 118/light beams 208-218 from the dispersive element 204 incident(s) the scan mirror 104 at a plurality of respective incident angles 148/220/402. The scan mirror 104 may comprise the dispersive element 302 to disperse the light 118/light beams 208-218 from the scan mirror 104.

Process 500 may continue by scanning the light 118/light beams 136/light beams 208-218 from light sources 102 across a field of view such as the field of view 114 at a plurality of respective scan angles such as the respective scan angles 120 to 130 using a scan mirror such as the scan mirror 104 (task 506). As mentioned above, the light 118/light beams 208-218 from the light sources 102 incident(s) the scan mirror 104 at a plurality of respective incident angles such as the respective incident angles 148/220/402. The scan mirror 104 may comprise the dispersive element 204.

Process 500 may continue by receiving each of the spectral wavelengths (colors) 150-158 at respective detectors such as the detectors 106 (task 508).

Process 500 may continue by a signal processor module such as the signal processor module 108 forming scan lines such as the image scan lines 146 for each of the spectral wavelengths (colors) 150-158 based on received light such as the received light 116 received at the detectors 106 (task 510).

Process 500 may continue by the signal processor module 108 constructing an image such as the image 144 by interleaving the image scan lines 146 (task 512). As mentioned above in the context of discussion of FIG. 1, the processor module 110 may interleave the image scan lines 146 received by the detectors 106 based on the received light 116. Furthermore, the received light 116 may be formed into the image scan lines 146 by the signal processor module 108, and interleaved to construct a stored image representation of the field of view 114 such as the image 144.

Figure 6:
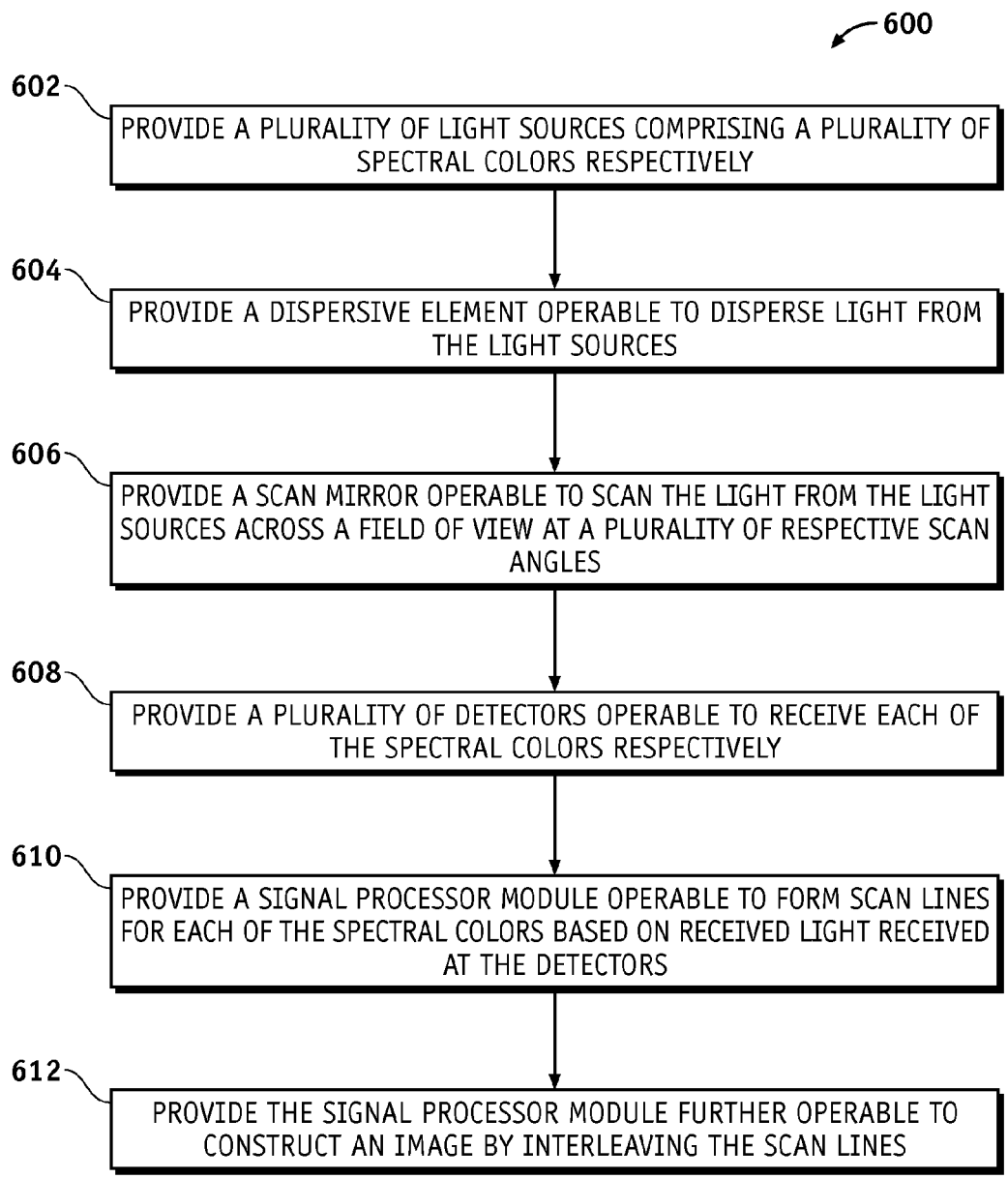
FIG. 6 is an illustration of an exemplary flowchart showing a process for providing a multi-spectral scan camera according to an embodiment of the disclosure.

FIG. 6 is an illustration of an exemplary flowchart showing a process 600 for providing a multi-spectral scan camera according to an embodiment of the disclosure. The various tasks performed in connection with process 600 may be performed mechanically, by software, hardware, firmware, computer-readable software, computer readable storage medium, or any combination thereof. It should be appreciated that process 600 may include any number of additional or alternative tasks, the tasks shown in FIG. 6 need not be performed in the illustrated order, and the process 600 may be incorporated into a more comprehensive procedure or process having additional functionality not described in detail herein.

For illustrative purposes, the following description of process 600 may refer to elements mentioned above in connection with FIG. 1. In some embodiments, portions of the process 600 may be performed by different elements of the system 100 and multi-spectral scan cameras 200-400 such as: the light sources 102, the scan mirror 104, the detectors 106, the signal processor module 108, etc. It should be appreciated that process 600 may include any number of additional or alternative tasks, the tasks shown in FIG. 6 need not be performed in the illustrated order, and the process 600 may be incorporated into a more comprehensive procedure or process having additional functionality not described in detail herein.

Process 600 may begin by providing a plurality of light sources such as the light sources 102 comprising a plurality of spectral wavelengths (colors) such as the spectral wavelengths 150-158 respectively (task 602).

Process 600 may continue by providing a dispersive element such as the dispersive element 204/302 operable to disperse light (light beams) such as the collimated light 206 from the light sources 102 (task 604). As mentioned above, the dispersive element 204/302 may comprise, for example but without limitation, a prism, a diffraction grating, or other dispersive element. The light 118/light beams 208-218 from the dispersive element 204 incident(s) the scan mirror 104 at a plurality of respective incident angles 148/220/402. The scan mirror 104 may comprise the dispersive element 302 to disperse the light 118/light beams 208-218 from the scan mirror 104.

Process 600 may continue by providing a scan mirror such as the scan mirror 104 operable to scan the light 118/light beams 136/light beams 208-218 from the light sources 102 across a field of view such as the field of view 114 at a plurality of respective scan angles such as the respective scan angles 120 to 130 (task 606). As mentioned above, the light 118/light beams 208-218 from the light sources 102 incident the scan mirror 104 at a plurality of respective incident angles 148/220/402. As mentioned above, the scan mirror 104 may comprise the dispersive element 302.

Process 600 may continue by providing a plurality of detectors such as the detectors 106 operable to receive each of the spectral wavelengths (colors) 150-158 respectively (task 608).

Process 600 may continue by providing a signal processor module such as the signal processor module 108 operable to form scan lines such as the image scan lines 146 for each of the spectral wavelengths 150-158 based on received light such as the received light 116 received at the detectors 106 (task 610).

Process 600 may continue by providing the signal processor module 108 further operable to construct an image by interleaving the image scan lines 146 (task 612).

In this manner, a multi-spectral scan camera provides the capability to increase the effective frame rate of an existing scan camera by using multi-spectral light sources (lasers with different wavelengths) and corresponding spectrally selective detectors.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-4 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 110 to cause the processor module 110 to perform specified operations. Such instructions, generally referred to as "computer program code" or "program code" (which may be grouped in the form of computer programs or other groupings), when executed, enable the system 100 and the multi-spectral scan cameras 200-400.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A multi-spectral scan camera comprising:
    at least four light sources configured to emit at least four light beams having at least four respective spectral wavelengths;
    a single scan mirror configured to simultaneously scan all of the at least four light beams from the at least four light sources across a field of view at a plurality of scan angles in a raster scan pattern, wherein the at least four light beams are simultaneously spread by one planar surface of the single scan mirror in a fan-like pattern perpendicular to a scan direction at multiple locations on the field of view at the plurality of scan angles based on the at least four respective spectral wavelengths of the at least four light beams and independent of the field of view, wherein each light beam of the at least four light beams has a specific scan angle of the plurality of scan angles, and wherein each scan angle of the plurality of scan angles differs; and
    at least four detectors configured to receive light having the at least four respective spectral wavelengths simultaneously from the field of view.

2. The multi-spectral scan camera of claim 1, further comprising a signal processor module configured to interleave scan lines of the at least four detectors.

3. The multi-spectral scan camera of claim 1, further comprising a dispersive element configured to disperse the at least four light beams from the at least four light sources into the single scan mirror based on the at least four respective spectral wavelengths of the at least four light beams, and wherein the dispersive element comprises one or more of: a prism and a diffraction grating.

4. The multi-spectral scan camera of claim 3, wherein the dispersive element comprises a prism.

5. The multi-spectral scan camera of claim 1, wherein the single scan mirror comprises a dispersive element, and wherein the dispersive element comprises one or more of: a prism and a diffraction grating.

6. The multi-spectral scan camera of claim 1, wherein the at least four light beams from the at least four light sources are incident at the single scan mirror at a plurality of respective incident angles.

7. A method for multi-spectral scanning, the method comprising:
    emitting at least four light beams from at least four light sources, wherein the at least four light beams having at least four respective spectral wavelengths;
    scanning all of the at least four light beams from the at least four light sources simultaneously across a field of view in a raster scan pattern at a plurality of scan angles in a fan-like pattern perpendicular to a scan direction independent of the field of view using one planar surface of a single scan mirror, wherein each light beam of the at least four light beams has a specific scan angle of the plurality of scan angles, and wherein each scan angle of the plurality of scan angles differs;
    receiving the at least four light beams having the at least four respective spectral wavelengths from the field of view at at least four detectors simultaneously; and
    increasing a vertical scan rate by a factor of a number of the light beams.

8. The method of claim 7, further comprising forming image scan lines for each of the at least four spectral wavelengths based on light received at the at least four detectors.

9. The method of claim 8, further comprising constructing an image by interleaving the image scan lines.

10. The method of claim 7, further comprising dispersing the at least four light beams from the at least four light sources into the single scan mirror based on the at least four respective spectral wavelengths of the plurality of light beams using a dispersive element.

11. The method of claim 7, wherein the at least four light beams from the at least four light sources are incident at the single scan mirror at a plurality of respective incident angles.

12. A method for providing a multi-spectral scan camera, the method comprising:
    providing at least four light sources configured to emit at least four light beams having at least four respective spectral wavelengths;
    providing a single scan mirror configured to simultaneously scan all of the at least four light beams from the at least four light sources across a field of view in a raster scan pattern, wherein the at least four light beams are simultaneously spread by one planar surface of the single scan mirror at a plurality of scan angles in a fan-like pattern perpendicular to a scan direction independent of the field of view, wherein each light beam of the at least four light beams has a specific scan angle of the plurality of scan angles, and wherein each scan angle of the plurality of scan angles differs; and providing at least four detectors configured to receive light having the at least four respective spectral wavelengths simultaneously from the field of view.

13. The method of claim 12, further comprising providing a signal processor module configured to form image scan lines for each of the at least four respective spectral wavelengths based on light received at the at least four detectors.

14. The method of claim 13, wherein the signal processor module is further configured to construct an image by interleaving the image scan lines.

15. The method of claim 12, further comprising providing a dispersive element operable to disperse the at least four light beams from the plurality of light sources into the single scan mirror based on the at least four respective spectral wavelengths.

16. The method of claim 15, wherein the dispersive element comprises a prism.

17. The method of claim 12, wherein the single scan mirror comprises a dispersive element.

18. The method of claim 12, wherein the at least four light beams from the at least four light sources are incident at the single scan mirror at a plurality of respective incident angles.

19. The method of claim 18, wherein the at least four light sources are positioned at respective light source angles.

20. The method of claim 12, wherein the at least four light sources are coupled to an optical fiber and the at least four light beams are formed into collimated light.

\* \* \* \* \*